United States Patent
Doyle et al.

[15] 3,671,478

[45] June 20, 1972

[54] RUBBER COMPOSITIONS

[72] Inventors: George Mitchel Doyle, Sutton Coldfield; Robert Eric Humphreys, Birmingham; Peter Lothar Ernst Moring, Sutton Coldfield, all of England

[73] Assignee: Dunlop Holding Limited, Birmingham, England

[22] Filed: Nov. 9, 1970

[21] Appl. No.: 88,086

Related U.S. Application Data

[63] Continuation-in-part of Ser. No. 858,175, Sept. 15, 1969, abandoned.

[30] Foreign Application Priority Data

Sept. 19, 1968   Great Britain......................44,463/68
Nov. 19, 1969   Great Britain......................56,675/69

[52] U.S. Cl..........................260/23.7 M, 152/330, 161/231, 161/244, 161/249, 260/33.6 AQ, 260/41.5 R, 260/45.7 R, 260/79.5 R, 260/79.5 P, 260/94.7 A, 260/726, 260/765, 260/873
[51] Int. Cl. ......................................C08c 11/06, C08d 9/00
[58] Field of Search....................260/41.5 R, 45.7 R, 94.7 A, 260/94.7 R; 152/330; 156/110 C; 161/231, 244, 249

[56] References Cited

UNITED STATES PATENTS

| | | | |
|---|---|---|---|
| 3,258,049 | 6/1966 | Ahles et al. | 152/330 |
| 3,423,265 | 1/1969 | Ahles et al. | 156/110 |
| 3,508,597 | 4/1970 | Iyengar | 152/357 |
| 3,527,740 | 9/1970 | Baker | 260/80.78 |

OTHER PUBLICATIONS

Leibu, Def. Publ. Search Copy of Ser. No. 748,659, filed July 30, 1968, No. T 862,008

*Primary Examiner*—Donald E. Czaja
*Assistant Examiner*—R. A. White
*Attorney*—Stevens, Davis, Miller & Mosher

[57] ABSTRACT

A vulcanizable composition which comprises natural rubber and/or synthetic rubber and a minor proportion of boric oxide. Preferably the amount of boric oxide is not greater than 20 parts by weight per 100 parts by weight of rubber.

18 Claims, No Drawings

RUBBER COMPOSITIONS

This invention relates to rubber compositions, and more particularly to rubber compositions containing boric oxide. The present application is a continuation-in-part of our application Ser. No. 858,175 filed Sept. 15, 1969, now abandoned.

In our application Ser. No. 858,175 we disclosed that the inclusion of boric oxide in rubber compositions reduces the degradation of polyester in rubber/polyester composites.

We have now found, as a result of further research, that the inclusion of boric oxide in rubber compositions is not only useful to reduce degradation of polyesters in polyester reinforced rubber articles, but also that boric oxide is an effective desiccant in rubber compositions and compares very favorably with calcium oxide, the material conventionally used.

According to one aspect of the present invention, therefore, a vulcanizable composition comprises natural rubber and/or a synthetic rubber and a minor proportion of boric oxide.

The amount of boric oxide in the composition will not usually be greater than 20.0 parts by weight per 100 parts by weight of rubber and is preferably in the range 0.5 to 10.0, more preferably 1.0 to 5.0 parts by weight per 100 parts by weight of rubber. While the boric oxide may be used in the unground state, it is preferable to grind the boric oxide and disperse it in a dispersing medium, for example an aromatic oil.

When the rubber composition is to be vulcanized, the boric oxide is introduced into the rubber during the compounding of the rubber composition prior to vulcanization.

The rubber composition can be based on a variety of different rubbers. Suitable rubbers include natural rubber, polybutadiene, styrene-butadiene, butadiene-acrylonitrile, synthetic polyisoprene, isoprene-butylene copolymer, polychloroprene, and ethylene-propylene copolymers and terpolymers. The composition may be oil-extended and may contain reinforcing agents such as carbon black and fillers. The composition may also contain silica, e.g., approximately 15 parts by weight per 100 parts by weight of rubber.

The unvulcanized composition will usually be compounded with vulcanizing ingredients such as sulphur and other vulcanizing agents and may contain accelerators, for example of the sulphenamide or the thiazole type.

In addition to the boric oxide the rubber composition may also include other ingredients to reduce its water absorption capacity. Examples of such ingredients are hydrophobic carbon black, e.g., carbon black alkylated according to the method described in British Pat. No. 910,310, and oils. Also, rubber of low moisture permeability may be used, for example butyl rubber, styrene-butadiene rubber of low ash content, and rubbers made by solution processes rather than rubbers made by emulsion processes.

The compositions of the present invention may be reinforced with natural and synthetic textile materials such as rayon, cotton, polyester and poly(vinyl alcohol) to form reinforced rubber articles. Particular applications where the inclusion of boric oxide is useful is in improving the adhesion between rubber and rayon in rayon reinforced articles such as tires and reduction of creep of rayon in rayon reinforced tires. Furthermore, it reduces the degradation of polyester in polyester/rubber composites. The textile reinforced articles may be tires, belting, vehicle suspension units and hose.

If desired, the textile reinforced article may comprise, for example, a textile reinforcement, a layer containing the boric oxide surrounding the reinforcement and a further layer or layers of the same or different rubber without boric oxide.

The inclusion of boric oxide in rubber compositions also helps to reduce the porosity in natural and olefinically unsaturated rubbers which have been cross-linked with boron complexes, the porosity being caused by the reaction of the boron complexes and water to form hydrogen. The presence of boric oxide is particularly useful where the rubber is to be vulcanized under low applied pressure, for example in a fluidbed or salt bath vulcanization system.

The invention is described and illustrated by the following Examples in which all parts are parts by weight; and the abbreviation "phr" means "parts by weight per 100 parts by weight of rubber."

EXAMPLE I

A motherstock was prepared to the formula (parts by weight):

70 natural rubber, 30 styrene-butadiene rubber (commercially available as SBR 1502), 6.0 aromatic oil, 45 general purpose furnace carbon black, 4.0 zinc oxide, 1.2 stearic acid and 2.7 sulphur. Three compositions were prepared by adding to portions of the motherstock (A) 0.9 phr of the sulphenamide type accelerator 2-morpholenothiobenzthiazole, (B) 0.9 phr of mercaptobenzthiazole and (C) 0.9 phr of 2-morpholenothiobenzthiazole and 5 phr of a calcium oxide desiccant mixture of 75 percent calcium oxide, 16 percent mineral oil (available as Shell Carnea 31) and 9 percent paraffin wax.

The compositions were calendered into sheets and placed immediately on either side of a layer of 2/1000 denier Terylene (polyester), Type B cords in a vulcanizate mould. The cord/rubber assemblage was then vulcanized by heating under pressure for 30 minutes at 153° C.

Cords were removed from the vulcanized assemblage and their strength determined immediately after vulcanization (unaged) and again after the vulcanized assemblage had been aged in the vulcanization mould for 6 hours at 160° C. The percentage loss in strength due to heat-ageing for 6 hours at 160° C. was calculated. The results obtained are given below in Table I:

TABLE I

| Composition | A | B | C |
|---|---|---|---|
| Cord strength (lb): unaged | 33.0 | 34.0 | 33.7 |
| Cord strength (lb): after ageing 6 hours at 160° C. | 22.1 | 26.4 | 31.9 |
| Cord strength loss (%) due to ageing 6 hours at 160° C. | 33.0 | 22.4 | 5.3 |

These results show that while the replacement of the amine liberating accelerator 2-morpholenothiobenzthiazole with mercaptobenzthiazole effects a reduction in cord strength loss, the cord strength loss is reduced to relatively minor proportions by the addition of the calcium oxide desiccant when the composition contains 2-morpholenothiobenzthiazole. This shows that, while amines or amine liberating materials may contribute, the major cause of degradation is the small amount of moisture normally present in rubbery compositions and textiles and which are absorbed by the calcium oxide desiccant. The theoretical amount of moisture absorbed by the calcium oxide in composition C to form calcium hydroxide is 0.5 percent. However, the next Example shows that the addition of calcium oxide to a rubbery composition can eventually contribute to degradation.

EXAMPLE II

A batch of Composition B of Example I was prepared and divided into four portions. To three of the portions were added as water absorbers, 5.0 phr Caloxol W3, 3.75 phr phthalic anhydride and 3.75 phr boric oxide, respectively. Cord/rubber assemblages were prepared according to the method given in Example I and the cord strength loss determined after heat-ageing for 6 hours at 160° C. However, in this instance, in addition to using sheets of the freshly prepared compositions, tests were carried out with sheets which had been allowed to absorb further moisture by exposing them to the laboratory atmosphere (65 percent relative humidity and 70° F.) for 6 days. The results obtained are given below in Table II:

TABLE II

Cord strength loss (percent) on Ageing 6 hours at 160° C.

| Water Absorber | Fresh Composition | Exposed Composition |
| --- | --- | --- |
| Nil | 22.4 | 23.0 |
| Calcium oxide | 3.5 | 40.2 |
| Phthalic anhydride | 37.3 | — |
| Boric oxide | 2.0 | 8.4 |

The above results show that the calcium oxide and phthalic anhydride can cause more degradation than if they had not been used. The increase in degradation may occur when the composition is freshly prepared, as in the case with that containing phthalic anhydride, or after it has been allowed to absorb further moisture as is the case with the composition containing calcium oxide.

EXAMPLE III

This Example shows the effect of the concentration of boric oxide in rubbery compositions on polyester cord strength retention when 2-morpholinothiobenzthiazole and tetramethylthiuram disulphide are employed as accelerators.

Compositions were made to the formula: 70 natural rubber; 30 emulsion polymerized sytrene-butadiene rubber; 6.0 aromatic oil; 1.2 stearic acid; 4.0 zinc oxide; 45 general purpose furnace carbon black; 2.7 insoluble sulphur; 0.9 2-morpholinothiobenzthiazole; 0.05 tetramethylthiuram disulphide and boric oxide, having an average particle size of 80 microns, in the amounts shown below.

The compositions were calendered into sheets and placed on either side of a layer of 2/1000 denier Terylene, Type B cords in a vulcanization mould, and the assemblage vulcanized from the vulcanization mould and their strength determined immediately after vulcanization (unaged) and again after the assemblage had been heated in a vulcanization mould for 6 hours at 160° C.

In a further test, the cord-rubber assemblage was immersed for 8 hours in boiling water prior to being returned to the vulcanization mould for ageing for 6 hours at 160° C. The following values for cord strength losses were obtained.

| Boric Oxide (phr) | 0 | 0.5 | 1.0 | 2.5 | 5.0 | 10.0 |
| --- | --- | --- | --- | --- | --- | --- |
| Initial cord strength (lb) | 33.3 | 33.2 | 34.5 | 33.5 | 34.7 | 33.8 |
| Cord strength loss (%) after: | | | | | | |
| (a) ageing 6 hours at 160° C. | 38.4 | 22.3 | 15.4 | 1.5 | 3.5 | 2.1 |
| (b) 8 hours immersion in boiling water and 6 hours at 160° C. | 47.1 | 39.9 | 34.2 | — | 15.3 | 9.1 |

EXAMPLE IV

This Example illustrates the effect of boric oxide concentration in a compound containing 2-mercaptobenzthiazole as accelerator.

The following values for initial cord strength and percentage cord strength loss after 6 hours at 160° C. were obtained using the cord and compounds of the previous Example but with 0.9 part of 2-mercaptobenzthiazole as accelerator in place of the 0.9 2-morpholinothiobenzthiazole and the 0.5 tetramethylthiuram disulphide.

| Boric Oxide (phr) | 0 | 0.5 | 1.0 | 2.5 | 5.0 | 10.0 |
| --- | --- | --- | --- | --- | --- | --- |
| Initial cord strength (lb) | 33.5 | 33.3 | 33.5 | 33.6 | 33.7 | 32.6 |
| Cord strength loss (%) after: | | | | | | |
| ageing 6 hours at 160° C. | 27.4 | 18.9 | 8.4 | 0.3 | 2.4 | 1.5 |

Loadings of boric oxide, particularly those in excess of 1.0 phr, can affect the properties of sulphur vulcanizates by virtue of their tendency to reduce state of cure. This can be corrected, for example, by increasing the loading of curatives and other well-known methods.

A feature of boric oxide is that it can be used with a wide range of accelerators of sulphur vulcanization, particularly those of the sulphenamide class. The following Example illustrates the use of boric oxide with a number of accelerator combinations:

EXAMPLE V

The experiment described in the above Example was repeated using the accelerators and boric oxide loadings shown below. The values for hardness, 300 percent extension modulus, elongation at break and resilience at 50° C were obtained on the vulcanized compositions. Cord strength losses were determined after the cured cord/rubber assemblages had been heat-aged for 6 hours at 160° C.

| Boric Oxide (phr) | 0.0 | 2.5 | 2.5 | 2.5 |
| --- | --- | --- | --- | --- |
| 2-morpholinothiobenzthiazole (phr) | 0.9 | 1.1 | — | — |
| N-cyclohexylbenzthiazole-2-sulphenamide (phr) | — | — | 1.1 | 1.1 |
| Tetramethylthiuram disulphide (phr) | 0.05 | 0.1 | 0.2 | — |
| Diphenylguanide (phr) | — | — | — | 0.5 |
| Hardness (°BS) | 62.0 | 61.0 | 61.0 | 62.0 |
| Resilience at 50°C. (%) | 87.8 | 88.8 | 88.1 | 87.7 |
| 300% extension modulus (Kg/cm$^2$) | 145 | 132 | 134 | 139 |
| Elongation at break (%) | 380 | 363 | 362 | 367 |
| Initial cord strength (lb) | 34.4 | | 34.4 | 33.5 |
| | 33.5 | | | |
| Cord strength loss (%) after: ageing 6 hours at 160°C. | 36.7 | 3.0 | 4.1 | Nil |

The following Example illustrates the use of boric oxide in compositions based on blends of natural rubber and emulsion and solution polymerized styrene-butadiene rubber and in oil-extended compositions.

EXAMPLE VI

Cord/rubber assemblages were prepared by the method previously described using 2/1000 denier Terylene cords and the composition given below. Cord strength losses were determined after heat-ageing the assemblages for 3 and 6 hours at 160° C.

| Composition | A | B | C | D |
| --- | --- | --- | --- | --- |
| Natural rubber | 70.0 | 70.0 | 70.0 | 70.0 |
| SBR 1502 | 30.0 | — | — | — |
| Solprene 1204 | — | 30.0 | — | — |
| Solprene 375 | — | — | 41.25 | — |
| Solprene 377 | — | — | — | 41.25 |
| Naphthenic extender oil | — | — | 18.75 | — |
| Aromatic extender oil | 6 | 6 | — | 18.75 |
| Stearic acid | 1.2 | 1.2 | 1.2 | 1.2 |
| Zinc oxide | 4.0 | 4.0 | 4.0 | 4.0 |
| GPF carbon black | 45.0 | 45.0 | 45.0 | 45.0 |
| Insoluble sulphur | 2.7 | 2.7 | 2.7 | 2.7 |
| N-cyclohexyl-benzthiazole-2-sulphenamide | 1.1 | 1.0 | — | — |
| Tetramethylthiuram disulphide | 0.05 | 0.05 | — | — |
| 2-mercaptobenzthiazole | — | — | 0.6 | — |
| Dibenzthiazyl disulphide | — | — | 0.6 | 0.6 |
| Boric oxide | 2.5 | 2.5 | 2.5 | 2.5 |

Solprene 1204, 375 and 377 are solution polymerized copolymers of styrene and butadiene containing approximately 25 percent styrene. In addition Solprenes 375 and 377 contain 37.5 percent of a naphthenic and aromatic extender oil, respectively.

The following results were obtained:

| Composition | A | B | C | D |
| --- | --- | --- | --- | --- |
| Initial cord strength (lb) | 34.4 | 34.4 | 33.4 | 34.4 |
| Cord strength loss (%) after: | | | | |
| 3 hours at 160° C. | 4.1 | 0.9 | Nil | Nil |
| 6 hours at 160° C. | 4.1 | 1.5 | 0.9 | Nil |

A well-known method of promoting adhesion between Terylene cord and rubbery compositions is to include in the composition a phenol such as resorcinol and a formaldehyde-generator such as hexamethylenetetramine or hexamethoxymethylmelamine. The next Example illustrates the use of boric oxide in conjunction with the aforementioned reagents. It shows that the inclusion of resorcinol and hexamethylenetetramine in a rubbery composition increases cord strength losses on heat-ageing. The reduction brought about by the addition of boric oxide suggests that apart from removing moisture the latter can also reduce any degradation due to aminolysis which may be caused by the hexamethylenetetramine.

EXAMPLE VII

The strength retention of polyester cord on heat-ageing for 6 hours at 160° C. was determined by the method already described using the following compositions:

Composition E
100 Natural rubber; 1.16 stearic acid; 10.0 zinc oxide; 45 EPT carbon black; 2.7 insoluble sulphur; 1.1 2-morpholinothiobenzthiazole; 1.0 phenylbetanaphthylamine; and 0.4 N-nitrosodiphenylamine.

Composition F
As Composition E but with the addition of 4.17 phr of a melt blend of 60 parts resorcinol and 40 parts stearic acid and 1.53 phr of hexamethylenetetramine.

Composition G
As Composition F but with the addition of 2.5 phr of boric oxide.

Composition H
As Composition G but with the 1.53 phr of hexamethylenetetramine replaced with 6.0 phr of hexamethoxymethylmelamine.

The following cord strength test results were obtained:

| Composition | E | F | G | H |
| --- | --- | --- | --- | --- |
| Initial cord strength (lb) | 33.9 | 33.1 | 33.4 | 34.0 |
| Cord strength loss (%) after: | | | | |
| 3 hours at 160° C. | 8.0 | 38.7 | 25.2 | 7.9 |
| 6 hours at 160° C. | 29.2 | 57.4 | 38.4 | 22.1 |

The boric oxide may be added to the composition in the form of dry powder or as a dispersion in oil or in oil and wax. The following Example illustrates the addition of boric oxide in the form of a dispersion.

EXAMPLE VIII

Boric oxide was ground in a ball-mill to an average particle size of 49 microns. It was then blended in a warm Winkworth mixer with Shell Carnea 31 oil and molten paraffin wax in the proportion of 75 boric oxide, 16 oil and 9 paraffin wax (parts by weight). The mixture formed a solid mass on cooling.

The strength of 2/1000 denier polyester cords were determined before and after heat-ageing for 6 hours at 160° C. in a vulcanized composition comprising: 100 natural rubber; 2.75 pine tar; 2.03 mineral oil; 0.45 stearic acid; 8.0 zinc oxide; 45 easy processing furnace carbon black; 0.47 phthalic anhydride; 0.8 N-dicyclohexyl-2-benzothiazylsulphenamide; 3.6 insoluble sulphur; 1.4 Nonox HFN (a blend of arylamines) and 3.3 parts of the boric oxide/oil/wax dispersion referred to above containing 2.5 parts of boric oxide.

The strength of the cord in the unaged composition was found to be 34.3 lb while the percentage loss in strength after ageing for 6 hours at 160° C. was only 1.5 percent.

Although Example II of the specification shows that phthalic anhydride can be the cause of strength losses these can be reduced to a very low magnitude by the presence of boric oxide.

A rubber compound was prepared to the formula:
70 natural rubber, 30 SBR 1502, 6.0 aromatic oil, 4.0 zinc oxide, 1.2 stearic acid, 45 general purpose furnace black, 2.7 insoluble sulphur and 0.9 2-morpholinothiobenzthiazole (parts by weight) and divided into four portions. Amounts corresponding to 5 parts per hundred of rubber of each of the following materials were weighed and immediately added to three of the four portions:

1. Aluminum oxide activated by heating for at least 24 hours at 140° C.
2. Activated aluminum oxide obtained from Hopkin and Williams Ltd.
3. Boric oxide.

The compositions were calendered into sheets and placed on either side of a layer of 2/1000 denier Terylene cords in a vulcanization mould. The cord/rubber assemblage was then vulcanized by heating under pressure for 30 minutes at 153° F.

The strength of the cords in the vulcanized assemblage was determined, immediately after vulcanization and again after ageing the assemblage for 6 hours at 160° C. The following results were obtained:

| Composition | | 1 | 2 | 3 |
| --- | --- | --- | --- | --- |
| Cord strength (lb): | unaged | 34.4 | 33.7 | 34.4 |
| | aged | 19.6 | 19.7 | 32.5 |
| Cord strength loss (%) due to ageing: | | | | |
| | 6 hours at 160° C. | 42.2 | 41.5 | 5.5 |

The above experiment was repeated using the fourth portion of the compound and the aluminum oxide used in Composition 1 except that on this occasion the activated aluminum oxide was heated after weighing for 24 hours at 140° C. This had the object of compensating for any loss in "activity" during the weighing process. The cord strength loss (percent) obtained after heat-ageing for 6 hours at 160° C. in the composition containing the aluminum oxide treated as described above was 40.7 percent.

EXAMPLE X

This Example illustrates the use of the polycarbodiimide "Antioxidant PCD" (marketed by Farbenfabriken Bayer) in conjunction with boric oxide in compositions based on different rubbers and containing different accelerators.

The strength of polyester cord were determined before and after heat-ageing in vulcanized assemblages of the following composition:

| Composition | 1 | 2 | 3 |
| --- | --- | --- | --- |
| Natural rubber | 70.0 | — | 70.0 |
| Shell IR 305 | — | 70.0 | 70.0 |
| SBR 1502 | 30.0 | — | 30.0 |
| Solprene 1204 | — | 30.0 | — |
| Aromatic oil | 6.0 | 6.0 | 6.0 |
| Stearic acid | 1.2 | 1.2 | 1.2 |
| Zinc oxide | 4.0 | 4.0 | 4.0 |
| general purpose furnace carbon black | 45.0 | 45.0 | 45.0 |

| | | | |
|---|---|---|---|
| Insoluble sulphur | 2.7 | 2.7 | 2.7 |
| Mercaptobenzthiazole | 0.9 | 0.9 | — |
| 2-morpholinothiobenzthiazole | — | — | 0.9 |
| Tetramethylthiuram disulphide | — | — | 0.05 |
| Boric oxide | 5.0 | 5.0 | 5.0 |
| Antioxidant PCD | 4.0 | 4.0 | 4.0 |

Shell IR 305 is synthetic cis-polyisoprene. Solprene 1204 is a solution polymerized styrene/butadiene rubber containing approximately 25 percent of styrene.

The following results were obtained:

| Composition | 1 | 2 | 3 |
|---|---|---|---|
| Initial cord strength (lb) | 34.8 | 34.4 | 33.6 |
| Cord strength loss (%) after heat-ageing for: | | | |
| 2 hours at 160° C. | Nil | 4.9 | Nil |
| 6 hours at 160° C. | 0.3 | 5.5 | 0.3 |

Composition 1 without the boric oxide and Antioxidant PCD gave a cord strength loss of 20.7 percent on heat-ageing for 6 hours at 160° C.

EXAMPLE XI

A rubbery composition was prepared to the following formulation:

| | Part(s) |
|---|---|
| Natural rubber | 50 |
| Styrene/butadiene rubber[1] | 50 |
| zinc oxide | 5.0 |
| fast extrusion furnace carbon black | 50.0 |
| dark factice | 10.0 |
| aromatic oil | 5.0 |
| dibenzthiazyl disulphide | 0.7 |
| arylamines | 1.0 |
| 4-isopropyl aminodiphenylamine | 2.0 |

[1]commercially available as SBR 1502

To portions of the above composition were added 4.0, 5.0, 6.7 and 8.0 parts per 100 rubber of a mixture consisting of 75 parts calcium oxide, 16 parts Shell Carnea 31 oil and 9 parts of paraffin wax.

To other portions of the above composition were added 2.0, 2.5, 4.0, 5.0, 6.7 and 8.0 parts per 100 rubber of a dispersion of 75 parts boric oxide in 25 parts mineral oil (available as Shell Carnea 31) which was prepared in the following manner:

A quantity of boric oxide, obtained from Boron Consolidated Limited, was dry-ground in a ball-mill until the average size of the boric oxide particles was reduced from 110 to 50 microns. The ground boric oxide was then dispersed by stirring in Shell Carnea 31 oil in the proportion of 75 parts boric oxide to 25 parts oil.

All the portions of the above-mentioned composition, together with one not containing a desiccant were extruded into a ribbon 1 inch wide and vulcanized "on-the-run" by immersion for 45 seconds in a eutectic mixture of sodium nitrate and sodium nitrite at 225° C. The tensile properties, hardness and specific gravity of the vulcanized extrudates were determined. The specific gravity was taken as a measure of the removal of porosity due to moisture — the higher the specific gravity the lesser the porosity.

When vulcanized in a mould under pressure for 55 minutes at 135° C., the above-mentioned composition gives a specific gravity of the order 1.130 to 1.145. A specific gravity of 1.135 is considered to indicate complete removal of porosity due to moisture, the difference being due to porosity due to air.

The following results were obtained:

| Desiccant—Dispersed Calcium Oxide | | | | |
|---|---|---|---|---|
| Desiccant loading (phr) | — | 4.0 | 5.0 | 6.7 | 8.0 |
| Concentration of active agent (phr) | — | 3.0 | 3.8 | 5.0 | 6.0 |
| Properties of vulcanized extruders: Specific gravity | 1.0 | 1.056 | 1.102 | 1.109 | 1.135 |
| Tensile strength (Kg/cm²) | 47 | 80 | 93 | 45 | 52 |
| 300% Modulus (Kg/cm²) | 43 | 80 | 87 | 17 | 21 |
| Elongation at break (%) | 325 | 300 | 320 | 676 | 655 |
| Hardness (Shore) | 32 | 51 | 52 | 42 | 43 |

| Desiccant—Dispersed Boric Oxide | | | | | |
|---|---|---|---|---|---|
| Desiccant loading (phr) | 2.0 | 2.5 | 4.0 | 5.0 | 6.7 | 8.0 |
| Concentration of active agent | 1.5 | 1.9 | 3.0 | 3.8 | 5.8 | 6.0 |
| Properties of vulcanized extrudates: Specific gravity | 1.103 | 1.100 | 1.135 | 1.135 1.130 | 1.131 |
| Tensile strength (Kg/cm²) | 87 | 85 | 85 | 83 | 52 | 49 |
| 300% Modulus (Kg/cm²) | 83 | 80 | 78 | 80 | 22 | 20 |
| Elongation at break (%) | 320 | 325 | 310 | 335 | 615 | 625 |
| Hardness (Shore) | 50 | 51 | 50 | 51 | 44 | 43 |

The above results show that, weight for weight, the boric oxide is approximately twice as effective as the calcium oxide as a moisture absorber and hence as an agent for reducing porosity due to moisture. Moreover, it is possible to add sufficient boric oxide dispersion (5.0 phr) to effect the virtually complete removal of porosity without a adverse effect on the tensile properties and hardness of the extrudate. The loading of calcium oxide containing material (8.0 phr) to achieve this causes a reduction in tensile properties and hardness.

EXAMPLE XII

The results quoted in this Example were obtained with the unground boric oxide as received from Boron Consolidated Limited before and after dispersion in Shell Carnea 31 oil. By comparison with the results in Example XI they show that while the boric oxide may be used in the unground state, it is preferable both to grind the boric oxide to reduce its particle size and disperse it in an oil or other suitable dispersed medium.

To portions of the composition described in Example XI were added 3.8 parts of the unground boric oxide and 2.5 and 5.0 parts of a dispersion comprising 75 parts of the unground boric oxide and 25 parts Shell Carnea 31 oil. The compounds were extruded and vulcanized by the method given in Example XI. The following results were obtained:

| | (a) not dispersed | (b) dispersed in oil | |
|---|---|---|---|
| Desiccant Type | | | |
| Desiccant loading (phr) | 3.8 | 2.5 | 5.0 |
| Concentration of active agent | 3.8 | 1.9 | 3.8 |
| Properties of vulcanized extrudate: Specific gravity | 1.014 | 1.0 | 1.061 |
| Tensile strength (Kg/cm²) | 65 | 80 | 81 |
| 300% Modulus | — | 73 | 76 |
| Elongation at break (%) | 290 | 330 | 320 |
| Hardness (Shore) | 48 | 42 | 47 |

EXAMPLE XIII

In this Example the loss of adhesion between rayon and vulcanized rubber due to moisture was investigated.

The following rubber composition was prepared:

| | Part(s) |
|---|---|
| Natural rubber | 70 |
| styrene/butadiene rubber[1] | 30 |
| aromatic oil | 6 |
| stearic acid | 1.2 |
| zinc oxide | 4 |
| general purpose furnace black | 45 |
| insoluble sulphur | 2.7 |
| morpholinothiobenzthiazole | 0.9 |
| tetramethylthiuram disulphide | 0.05 |

(1)commercially available as SBR 1502.

Portions of the above compound with and without 3.33 parts per 100 parts of rubber of boric oxide dispersion (as prepared in Example XI) were allowed to absorb moisture by exposure for up to 32 days in the laboratory atmosphere (21° C./66 percent relative humidity).

The adhesion between 2/1650 denier rayon cords, treated with a conventional latex resorcinol-formaldehyde adhesive, and the portions of the compound was determined at various times during the exposure period. The bond strength was determined according to the method of Wood (Trans. Inst. Rubber Ind, 32, 1,1956) using a cure of 30 minutes at 150° C. The following results were obtained:

| Adhesion (Kg/cm) after ageing compound for: (Days) | 0 | 1 | 2 | 4 | 8 |
|---|---|---|---|---|---|
| Boric oxide present | 10.2 | 11.2 | 12.5 | 11.2 | 11.0 |
| Boric oxide absent | 11.0 | 10.2 | 10.0 | 9.9 | 9.8 |
|  | 16 | 32 |  |  |  |
| Boric oxide present | 11.8 | 11.3 |  |  |  |
| Boric oxide absent | 9.0 | 8.7 |  |  |  |

EXAMPLE XIV

In this Example boric oxide was compared with calcium oxide, the conventional desiccant.

A dispersion of boric oxide was prepared by dry-grounding in a ball-mill boric oxide so as to reduce its particle size from 110 to 50 microns. 75 parts of the ground boric oxide was then dispersed in 16 parts Shell Carnea 31 oil and 9 parts paraffin wax. The calcium oxide dispersion consisted of 75 parts calcium oxide, 16 parts Shell Carnea 31 oil and 9 parts paraffin wax.

2.5 parts of the boric oxide dispersion or 5 parts of the calcium oxide dispersion were then added to a natural rubber composition, the formulation of which is given below.

Using a salt bath the rubber was extruded at rates of 2, 4 and 8 ft/minute corresponding to immersion (curing) times of 30, 60 and 120 seconds at 220° C. The properties of the vulcanized extrudates were determined.

|  | Part(s) |
|---|---|
| natural rubber | 100 |
| zinc oxide | 5.0 |
| stearic acid | 1.0 |
| MT carbon black | 25 |
| calcium silicate | 25 |
| aromatic oil | 3.0 |
| polymerized 2,2,4-trimethyl-1,2-dihydroquinoline | 1.0 |
| mercaptobenzthiazole | 0.7 |
| sulphur | 2.5 |
| Desiccant dispersion (phr) | None |

| Extrusion rate (ft./min.) | 2 | 4 | 8 |
|---|---|---|---|
| 100% modulus (psi) | 35 | 35 | 45 |
| 300% modulus (psi) | 70 | 130 | 140 |
| 500% modulus (psi) | 155 | 355 | 395 |
| Tensile strength (psi) | 200 | 540 | 535 |
| Elongation at break (%) | 605 | 610 | 560 |
| Hardness (Shore A2) |  | very spongy |  |
| Specific gravity | <1.0 | <1.0 | <1.0 |
| Desiccant dispersion (phr) |  | 5.0 Calcium oxide |  |

| Extrusion rate (ft./min.) | 2 | 4 | 8 |
|---|---|---|---|
| 100% modulus (psi) | 40 | 60 | 75 |
| 300% modulus (psi) | 80 | 165 | 160 |
| 500% modulus (psi) | 175 | 440 | 810 |
| Tensile strength (psi) | 425 | 880 | 1440 |
| Elongation at break (%) | 750 | 670 | 620 |
| Hardness (Shore A2) | 28 | 25 | 32 |
| Specific gravity | 1.03 | <1.0 | <1.0 |
| Desiccant dispersion (phr) |  | 2.5 boric oxide |  |

| Extrusion rate (ft./min.) | 2 | 4 | 8 |
|---|---|---|---|
| 100% modulus (psi) | 45 | 90 | 70 |
| 300% modulus (psi) | 100 | 280 | 70 |
| 500% modulus (psi) | 240 | 810 | 730 |
| Tensile strength (psi) | 505 | >1120 | 1060 |
| Elongation at break (%) | 695 | 590 | 590 |
| Hardness (Shore A2) | 32 | 35 | 35 |
| Specific gravity | 1.08 | 1.13 | 1.11 |

EXAMPLE XV

This Example is similar to Example XIV except that styrene/butadiene rubber was used in place of the natural rubber.

|  | Parts |
|---|---|
| SBR 1502 | 100 |
| zinc oxide | 5.0 |
| paraffin wax | 2.0 |
| fast extrusion furnace carbon black | 50.0 |
| dark factice | 10.0 |
| aromatic oil | 5.0 |
| dibenzthiazyl disulphide | 1.0 |
| blend of arylamines | 1.0 |
| 4-isopropyl aminodiphenylamine | 2.0 |
| sulphur | 2.5 |
| Desiccant dispersion (phr) | None |

| Extrusion rate (ft./min.) | 2 | 4 | 8 |
|---|---|---|---|
| 100% modulus (psi) | 125 | 160 | 95 |
| 300% modulus (psi) |  |  | 360 |
| Tensile strength (psi) | 460 | 625 | 455 |
| Elongation at break (%) | 230 | 270 | 380 |
| Hardness (Shore A2) | 35 | 38 | 40 |
| Specific gravity | <1.0 | <1.0 | <1.0 |
| Desiccant dispersion (phr) |  | 5.0 Calcium oxide |  |
| Extrusion rate (ft./min.) | 2 | 4 | 8 |
| 100% modulus(psi) | 300 | 300 | 360 |
| 300% modulus (psi) |  | 1510 | 1220 |
| Tensile strength (psi) | 1370 | 1600 | 1450 |
| Elongation at break (%) | 280 | 320 | 360 |
| Hardness (Shore A2) | 56 | 56 | 56 |
| Specific gravity | 1.14 | 1.14 | 1.14 |
| Desiccant dispersion (phr) |  | 2.5 Boric oxide |  |

| Extrusion rate (ft./min.) | 2 | 4 | 8 |
|---|---|---|---|
| 100% modulus (psi) | 245 | 220 | 230 |
| 300% modulus (psi) |  | 1150 | 1055 |
| Tensile strength (psi) | 1055 | 1300 | 1260 |
| Elongation at break (%) | 265 | 340 | 360 |
| Hardness (Shore A2) | 52 | 54 | 54 |
| Specific gravity | 1.01 | 1.04 | 1.03 |

EXAMPLE VI

This Example is similar to Example XIV except that a polychloroprene rubber was used instead of natural rubber.

|  | Part(s) |
|---|---|
| polychloroprene rubber(1) | 100 |
| light calcined magnesia | 4.0 |
| stearic acid | 1.0 |
| aromatic oil | 10.0 |
| dark factice | 10.0 |
| fast extrusion furnace carbon black | 50.0 |
| MT carbon black | 25.0 |
| zinc oxide | 5.0 |
| diethylthiourea | 0.5 |
| N,N'-dibetanaphthyl-p-phenylenediamine | 1.0 |

(1)commercially available as Neoprene WX.

| Desiccant dispersion (phr) |  | None |  |
|---|---|---|---|
| Extrusion rate (ft./min.) | 2 | 4 | 8 |
| 100% modulus (psi) | 620 | 620 | 445 |
| Tensile strength (psi) | 920 | 1170 | 1005 |
| Elongation at break (%) | 140 | 170 | 195 |
| Specific gravity | 1.0 | 1.0 | 1.0 |
| Desiccant dispersion (phr) |  | 5.0 Calcium oxide |  |

| Extrusion rate (ft./min.) | 2 | 4 | 8 |
|---|---|---|---|
| 100% modulus (psi) | 1120 | 1010 | 810 |
| Tensile strength (psi) | 1960 | 2120 | 2060 |
| Elongation at break (%) | 160 | 175 | 200 |
| Specific gravity | 1.41 | 1.40 | 1.40 |
| Desiccant dispersion (phr) |  | 2.5 Boric oxide |  |

| Extrusion rate (ft./min.) | 2 | 4 | 8 |
|---|---|---|---|
| 100% modulus (psi) | 910 | 910 | 650 |

| Tensile strength (psi) | 1550 | 1660 | 1790 |
|---|---|---|---|
| Elongation at break (%) | 150 | 155 | 195 |
| Specific gravity | 1.30 | 1.30 | 1.30 |

Having now described our invention, what we claim is:

1. A vulcanizable composition which comprises a rubber selected from the group consisting of diene rubbers and ethylene-propylene rubbers, and a minor proportion of boric oxide.

2. A vulcanizable composition according to claim 1 in which the amount of boric oxide is not greater than 20 parts by weight per 100 parts by weight of rubber.

3. A vulcanizable composition according to claim 2 in which the amount of boric oxide is in the range 0.5 to 10 parts by weight per 100 parts by weight of rubber.

4. A vulcanizable composition according to claim 3 in which the amount of boric oxide is in the range 1 to 5 parts by weight per 100 parts by weight of rubber.

5. A vulcanizable composition according to claim 1 in which the synthetic rubber is a styrene/butadiene rubber.

6. A vulcanizable composition according to claim 1 in which the synthetic rubber is a polychloroprene rubber.

7. A vulcanizable composition according to claim 1 in which the composition contains carbon black.

8. A vulcanizable composition according to claim 7 in which at least a portion of the carbon black is a hydrophobic carbon black.

9. A vulcanizable composition according to claim 1 in which the rubber is an oil extended rubber.

10. A vulcanizable composition according to claim 1 which contains sulphur and a sulphenamide-type accelerator as the vulcanization system.

11. A vulcanizable composition according to claim 1 which contains sulphur and a thiazole-type accelerator as the vulcanization system.

12. A vulcanizable composition according to claim 1 which contains stearic acid.

13. A vulcanizable composition according to claim 1 which is reinforced with a textile reinforcement member.

14. A vulcanizable composition according to claim 13 in which the textile reinforcement member is rayon.

15. A vulcanizable composition according to claim 13 in which the textile reinforcement member is a polyester.

16. A vulcanizable composition according to claim 13 in which the textile reinforcement member is in the form of polyester yarns or cords.

17. A vulcanizable composition according to claim 13 in which the composition containing boric oxide is in the form of a barrier layer around the textile reinforcement member.

18. A reinforced rubber article comprising a textile reinforcing member and a vulcanizate obtained by curing a vulcanizable rubber composition, the rubber composition comprising a rubber selected from the group consisting of diene rubbers and ethylene-propylene rubbers, and boric oxide.

* * * * *